US012352543B2

(12) United States Patent
Edwards et al.

(10) Patent No.: US 12,352,543 B2
(45) Date of Patent: Jul. 8, 2025

(54) MOVING TARGET TRAINER

(71) Applicant: BULLSEYE TARGET SYSTEMS LLC, Sumter, SC (US)

(72) Inventors: Aaron Lawrence Edwards, Sumter, SC (US); Lynn Earl Gooch, Blairsville, GA (US)

(73) Assignee: BULLSEYE TARGET SYSTEMS LLC, Sumter, SC (US)

( * ) Notice: Subject to any disclaimer, the term of this patent is extended or adjusted under 35 U.S.C. 154(b) by 688 days.

(21) Appl. No.: 17/387,254

(22) Filed: Jul. 28, 2021

(65) Prior Publication Data

US 2023/0033184 A1 Feb. 2, 2023

(51) Int. Cl.
*F41J 9/02* (2006.01)
*B66D 1/74* (2006.01)

(52) U.S. Cl.
CPC .............. *F41J 9/02* (2013.01); *B66D 1/7405* (2013.01)

(58) Field of Classification Search
CPC . F41J 9/02; F41J 9/00; F41J 9/08; F41J 9/14; F41J 11/00; B66D 1/50; B66D 1/7405
USPC .................................................. 273/366–370
See application file for complete search history.

(56) References Cited

U.S. PATENT DOCUMENTS 650,008 A 5/1900 Hamel et al.
3,659,767 A * 5/1972 Martin .............. B65H 23/1888 226/25
4,222,564 A 9/1980 Allen et al.
5,367,232 A 11/1994 Netherton et al.
8,655,257 B2 2/2014 Spychaiski
2013/0056934 A1* 3/2013 Kipp .......................... F41J 7/06 273/369
2013/0061820 A1* 3/2013 Earl .......................... F41J 9/02 119/839
2013/0146827 A1* 6/2013 Serra ................... B66D 1/7405 254/278

(Continued)

FOREIGN PATENT DOCUMENTS

CH 660782 A5 6/1987
CN 209504122 U 10/2019

(Continued)

OTHER PUBLICATIONS

English machine translation of KR-101889715-B1 (Kim) (Year: 2018).*

(Continued)

*Primary Examiner* — Michael D Dennis
(74) *Attorney, Agent, or Firm* — Sughrue Mion, PLLC

(57) ABSTRACT

A system for moving a practice target includes a capstan winch assembly including a drive wheel; a target sled; a rope that connects the target sled to the drive wheel in an endless loop, wherein a first end of the rope is connected to a first end of the target sled and a second end of the rope is connected to a second end of the target sled; a sensor configured to detect a location of the sled; a motor configured to control rotation of the drive wheel bi-directionally, wherein the rope is provided on the drive wheel so as to move by rotation of the drive wheel; a user input unit located remotely from the capstan winch assembly and the target sled; and a processor including a memory programmed to control rotation of the drive wheel, thereby controlling movement of the target sled.

7 Claims, 10 Drawing Sheets

(56) References Cited

U.S. PATENT DOCUMENTS

| | | | | |
|---|---|---|---|---|
| 2021/0139299 | A1* | 5/2021 | Crain | B66D 1/00 |
| 2021/0325154 | A1* | 10/2021 | Difato | F41J 9/02 |

FOREIGN PATENT DOCUMENTS

| | | | | |
|---|---|---|---|---|
| CN | 210892880 U | | 6/2020 | |
| CN | 212567155 U | | 2/2021 | |
| DE | 30 14 613 A1 | | 10/1981 | |
| KR | 101889715 B1 | * | 9/2018 | F41J 9/02 |
| RU | 85224 A1 | | 7/2009 | |

OTHER PUBLICATIONS

Electrical Engineering Stack Exchange, "sensor to detect rope position, as it nears the end of the line retreval," answer by Neil_UK posted Oct. 31, 2015, https://electronics.stackexchange.com/questions/198208/sensor-to-detect-rope-position-as-it-nears-the-end-of-the-line-retreval (Year: 2015).*

Brenzy "Shooting the Mile, part one", published Jan. 2017 (Year: 2017).*

"LIMO Mobile Ground Moving Target System", Author/Company MSE Engineering AB—http://www.mseab.se/wp-content/uploads/2017/02/Folder-LIMO-2016_web-1.pdf, Feb. 2017.

Bruce E. Wilson, "Moving Personnel Targets and the Combat Infantryman", Dec. 3, 1971.

SAAB, "Live Fire Training", Oct. 20, 2020.

ATS Targets, "*I21C Moving Target System*", Jan. 5, 2011 www.youtube.com/watch ?v=6u9NFpDiPfE.

Ministry of Defence and Defence Safety Authority, *JSP 403 Volume 2 Edition 3 Change 6 Targetry*, Aug. 31, 2011.

* cited by examiner

Top View

Spring/Weight Tensioner System
Side View

MOVING TARGET TRAINER

BACKGROUND OF THE INVENTION

1. Field

The present disclosure is directed to a moving target trainer, and in particular to moving practice targets that can be used for air-to-surface target training. The present disclosure is also applicable for surface-to-surface target training.

2. Description of the Related Art

Moving targets are used to provide air-to-surface target training for pilots of military aircraft. However, the traditional training systems suffer from several drawbacks, including unrealistic training conditions, expensive set-up, and costly repairs.

A first type of moving target for shooting includes a remote control vehicle that tows a trailer or sled assembled with a practice target.

For fixed wing, high altitude military aircraft, the only viable system used to train with moving target engagements utilizes a remote controlled vehicle. This system involves selecting a vehicle, and installing expensive electronics on board for remotely operating the steering wheel, accelerator/brake pedals and the gear shift. Cameras that provide real-time viewing of the local scenery are installed on the vehicle which allow an operator to manually control the vehicle from a safe distance. In most circumstances, a long trailer or series of trailers connected together, must be fabricated with a practice target and placed on site. The trailers are then towed 50-80 ft behind the remote controlled vehicle to move the target on a path through an engagement area. This arrangement is designed to provide enough distance between the practice target and the remote controlled vehicle, so that during engagement, the remote controlled vehicle is not inadvertently destroyed by misdirected armaments.

There are many limitations with this system. The costs are high to fabricate and maintain the system. Errant rounds frequently strike the remote controlled vehicle, rendering it disabled or completely destroyed. These systems require user training and constant monitoring and/or manual control. The trailer fabricated with the target and the remote controlled vehicle are difficult to repair. Limitations are usually placed on the pilots, such as offset headings, in an attempt to keep errant rounds from striking the remote controlled vehicle. This prevents the pilot from engaging the target "on-axis", meaning straight in line with the target, which is the most tactically sound method for engaging a moving target. The remote control capabilities of these vehicles are limited in range. Terrain and vegetation play a significant role in the distance that these systems can be operated due to signal degradation of the transmitters and receivers required to operate the remote controlled vehicles.

The second type of conventional moving target includes a rail system. For rotary wing aircraft (helicopters), the current system used for training with moving target engagements is by utilizing such a rail system. These types of moving targets involve extensive construction for the rail tracks, high costs, and very limited firing parameters. The practice targets are powered by gas or electric motors to travel along the rail system. The rail system is usually protected by a large dirt berm that is built adjacent to the rails, and thus, designed as a permanent or semi-permanent structure.

There are many limitations with these rail systems. They require a very low angle trajectory, or else the rail system will be destroyed. This is suitable for helicopters at low altitudes only. Fixed wing aircraft do not use this type of target trainer due to the angle restrictions. Since the movement of the targets is limited to the location of the rails, the movement is not realistic to actual engagements. Also, they are not realistic because there is no dust created from target movement and their movement is perfectly smooth due to operating on a rail. These targets must be engaged on a perpendicular axis, which is not a preferred technique for engaging a moving target. These systems are extremely expensive. Construction costs, environmental considerations, underground power lines, and constant maintenance make these training systems unattainable for many.

For at least the foregoing reasons, there is a need for a moving practice target which allows military aircraft operators to operationally employ their weapons under more realistic conditions, and at reasonable costs.

SUMMARY

According to an aspect of the disclosure, a system for moving a practice target, includes a capstan winch assembly including a drive wheel; a target sled; a rope that connects the target sled to the drive wheel in an endless loop, wherein a first end of the rope is connected to a first end of the target sled and a second end of the rope is connected to a second end of the target sled; a sensor configured to detect a location of the sled; a motor configured to control rotation of the drive wheel bi-directionally, wherein the rope is provided on the drive wheel so as to move by rotation of the drive wheel; a user input unit located remotely from the capstan winch assembly and the target sled; and a processor including a memory programmed to: receive a start command based on an input of a user from the user input unit; based upon receiving the start command, control rotation of the drive wheel to move the rope thereby causing the target sled to travel at a predetermined speed until the target sled reaches a predetermined location; and when the target sled reaches the predetermined location based on the detection by the sensor, control the motor to stop rotation of the drive wheel thereby causing the target sled to stop traveling.

The capstan winch assembly may include a tensioner system for maintaining a predetermined tension of the rope at opposing first and second sides of the drive wheel during rotation of the drive wheel.

The tensioner system may include two sets of pulleys, including an upper set of pulleys and a lower set of pulleys, with the rope disposed in contact with each of the upper set of pulleys and the lower set of pulleys in an alternating configuration, wherein one of the upper set of pulleys or the lower set of pulleys is movable towards and away from the other one of the upper set of pulleys and the lower set of pulleys so as to increase or decrease a distance therebetween and adjust a slack in the rope.

The drive wheel may include two drive wheels, wherein grooves are provided in the drive wheels for holding the rope therein, and the first set of pulleys and the second set of pulleys provide tension to the rope so as to prevent the rope from coming out of the grooves of the two drive wheels.

The system may further include a metal crimp disposed on the rope, and wherein the sensor is a metal proximity sensor configured to detect when the metal crimp passes the sensor, and wherein the processor is configured to determine the location of the sled based a signal received from the metal proximity sensor that indicates whether the metal crimp has passed by the sensor.

The sensor may include a magnet proximity sensor that counts the drive wheel revolutions, and wherein the processor is programmed to determine the speed of the sled based on a signal received from the magnet proximity sensor.

A method of controlling a moving target system, wherein the system includes a capstan winch assembly including a drive wheel; a target sled; a rope that connects the target sled to the drive wheel in an endless loop, wherein a first end of the rope is connected to a first end of the target sled and a second end of the rope is connected to a second end of the target sled; a sensor configured to detect a location of the sled; a motor configured to control rotation of the drive wheel, wherein the rope is provided on the drive wheel so as to move by rotation of the drive wheel; a user input unit located remotely from the capstan winch assembly and the target sled; and a processor including a memory programmed to control the motor, includes receiving a start command based on an input of a user from the user input unit; based upon receiving the start command, controlling rotation of the drive wheel to move the rope thereby causing the target sled to travel at a predetermined speed until the target sled reaches a predetermined location; and when the target sled reaches the predetermined location based on the detection by the sensor, controlling the motor to stop rotation of the drive wheel thereby causing the target sled to stop traveling.

The method using the capstan winch assembly includes a tensioner system for maintaining a predetermined tension of the rope at opposing first and second sides of the drive wheel during rotation of the drive wheel.

The method including the tensioner system has two sets of pulleys, including an upper set of pulleys and a lower set of pulleys, with the rope disposed in contact with each of the upper set of pulleys and the lower set of pulleys in an alternating configuration, and moving one of the upper set of pulleys or the lower set of pulleys towards and away from the other one of the upper set of pulleys and the lower set of pulleys so as to increase or decrease a distance therebetween and adjust a slack in the rope.

The method, includes the drive wheel that comprises two drive wheels, wherein grooves are provided in the drive wheels for holding the rope therein, and the first set of pulleys and the second set of pulleys provide tension to the rope so as to prevent the rope from coming out of the grooves of the two drive wheels.

The method, wherein the system has a metal crimp disposed on the rope, and wherein the sensor is a metal proximity sensor configured to detect when the metal crimp passes the sensor, includes determining the location of the sled based a signal received from the metal proximity sensor that indicates whether the metal crimp has passed by the sensor.

The method, wherein the sensor has a magnet proximity sensor that counts the drive wheel revolutions, includes determining the speed of the sled based on a signal received from the magnet proximity sensor.

A system for moving a practice target, includes a pair of spool winch assemblies, including a first spool winch assembly and a second spool winch assembly, wherein the first spool winch assembly includes a first spool and a first motor, and the second spool winch assembly includes a second spool and a second motor; a target sled; a rope that connects the target sled to the first spool of the first spool winch assembly and the second spool of the second spool winch assembly, wherein a first end of the rope is connected to the first spool and a second end of the rope is connected to the second spool; a first sensor provided for the first spool and a second sensor provided for the second spool, are configured to detect a location of the sled; wherein the first motor of the first winch assembly and the second motor of the second winch assembly, are configured to control rotation of the first spool and the second spool, respectively, wherein the rope gathers on the first spool or the second spool depending on whether the first spool or the second spool is being rotated; a user input unit located remotely from the pair of spool winch assemblies and the target sled; and a processor including a memory programmed to: receive a start command based on an input of a user from the user input unit; based upon receiving the start command, control the first motor of the first spool winch assembly to cause rotation of the first spool to move the rope thereby causing the target sled to travel toward the first spool winch assembly at a predetermined speed, and away from the second spool winch assembly, until the target sled reaches a predetermined location; and when the target sled reaches the predetermined location based on the detection by the first sensor, control the first motor to stop rotation of the first spool thereby causing the target sled to stop traveling.

BRIEF DESCRIPTION OF THE DRAWINGS

The above and other aspects of the present invention will become more apparent from the following description of exemplary embodiments, taken in conjunction with the accompanying drawings of which.

DETAILED DESCRIPTION

The following detailed description of example implementations refers to the accompanying drawings. The same reference numbers in different drawings may identify the same or similar elements.

Figure 1:
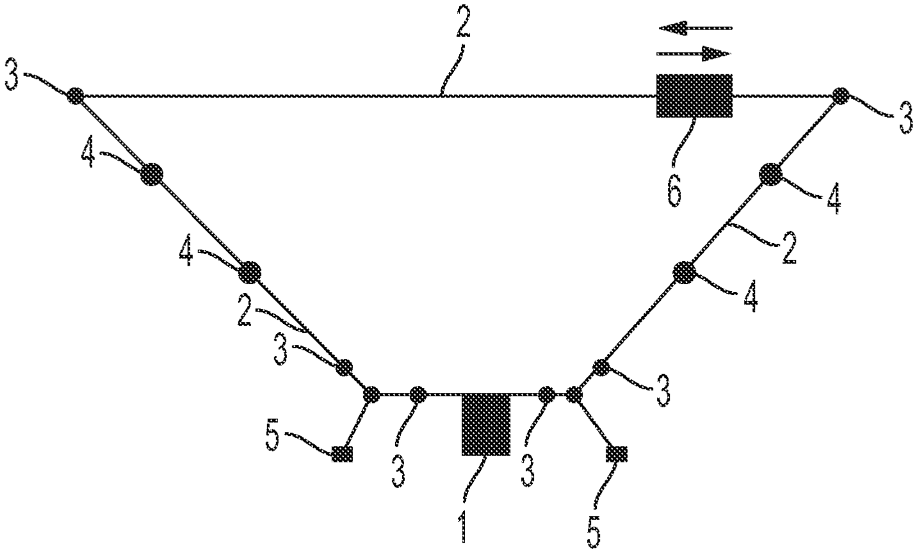
FIG. 1 is a schematic plan view of an overall arrangement of the system in the field.
Figure 2:
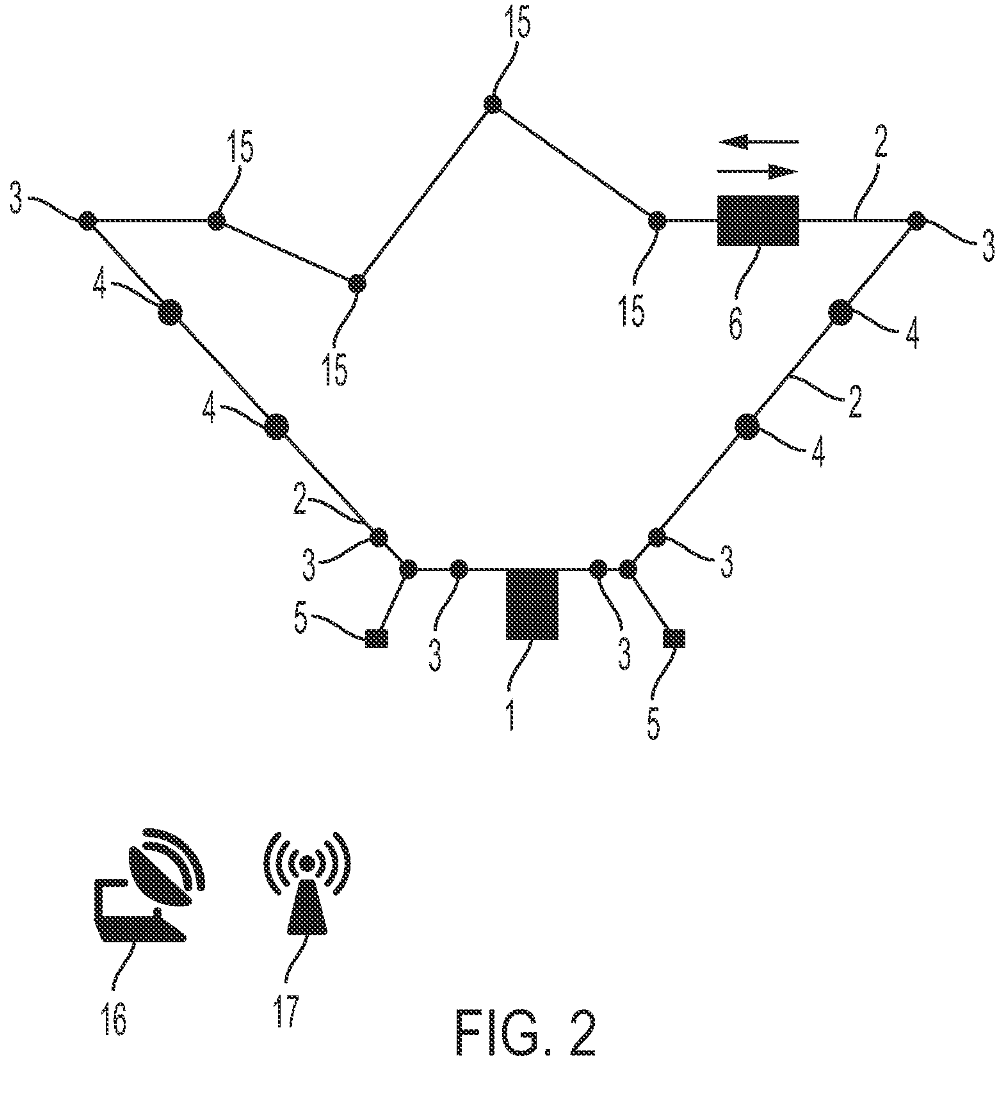
FIG. 2 is a schematic plan view of another example arrangement of the system in the field.
Figure 3:
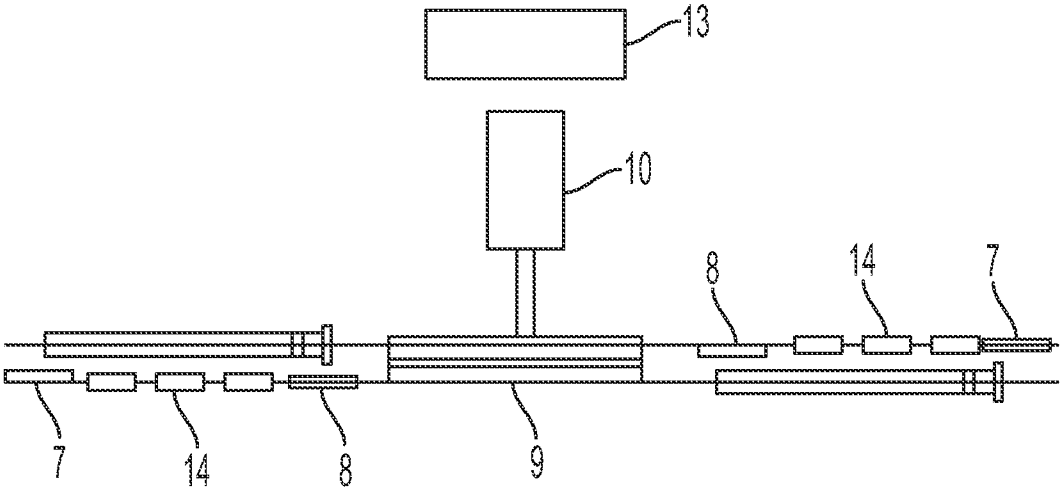
FIG. 3 is a top view of an example of the capstan winch assembly.
Figure 4:
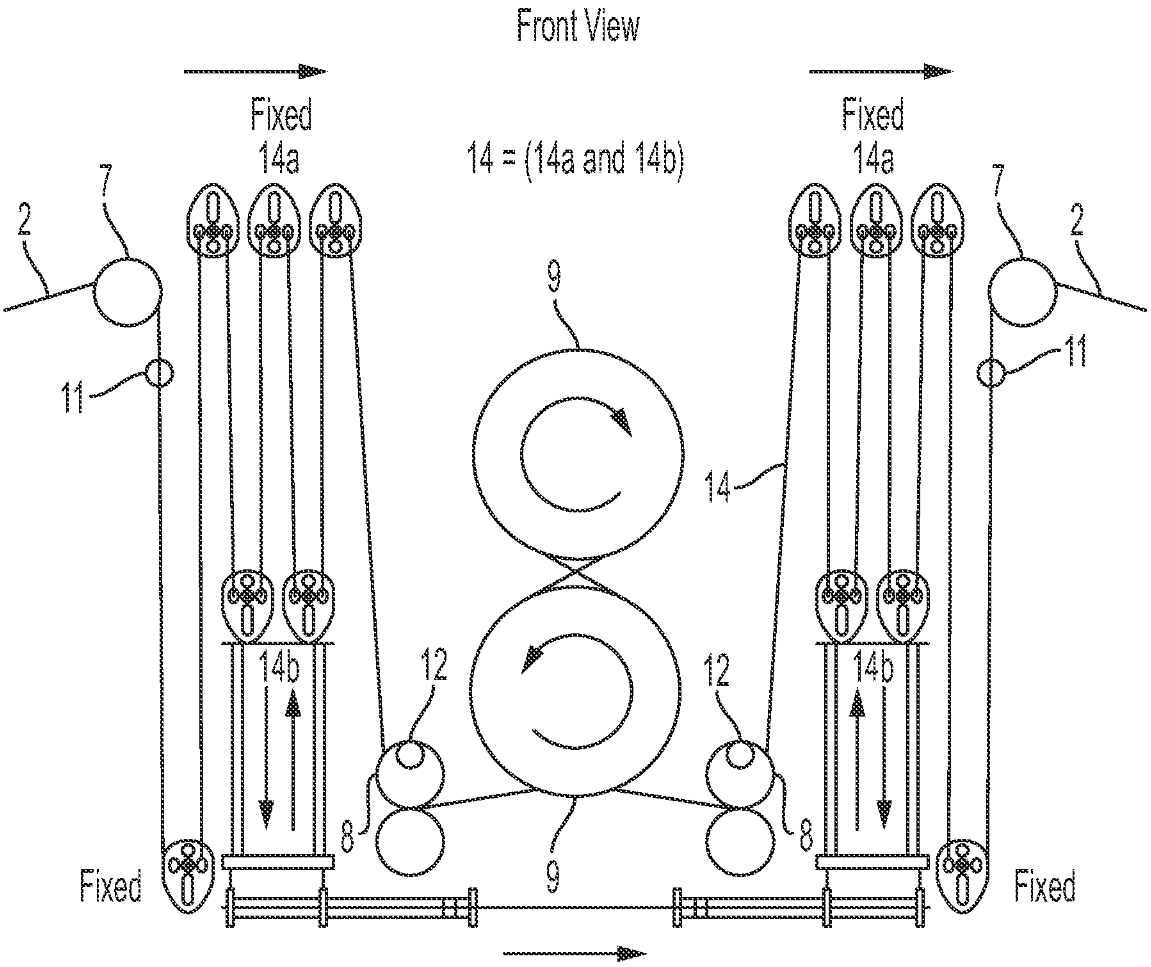
FIG. 4 is a front view of an example of the capstan winch assembly.
Figure 5:
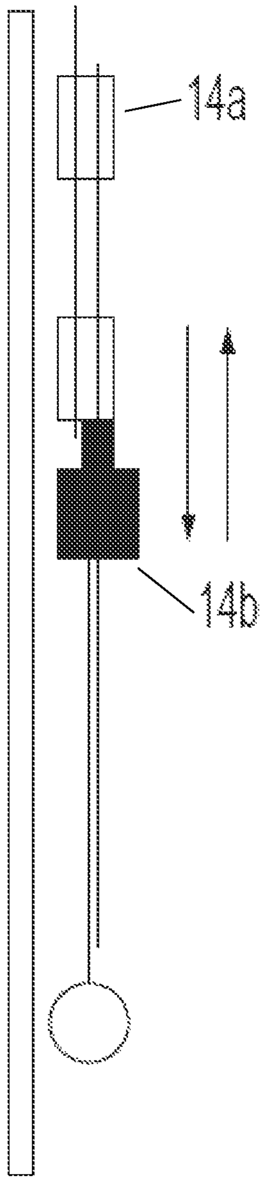
FIG. 5 is a side view of an example of the tensioner system.
Figure 6:
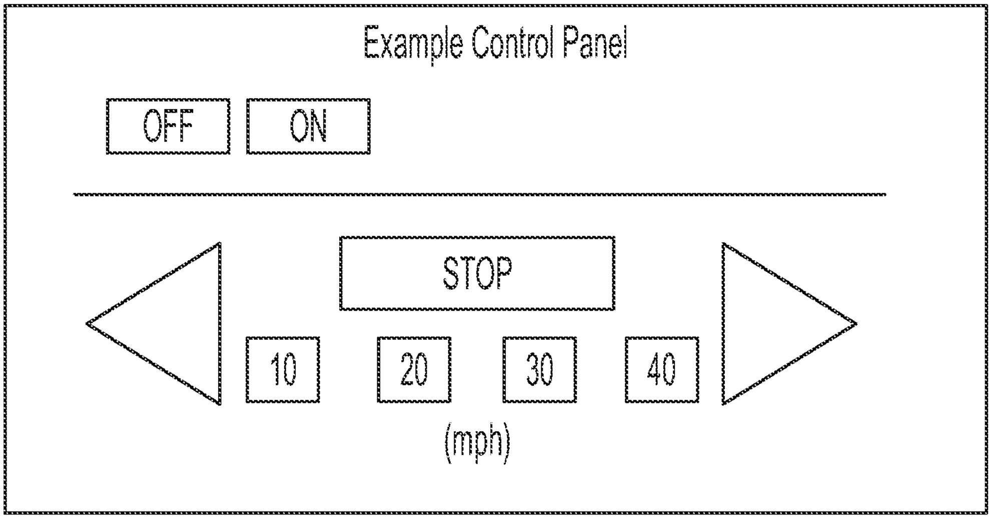
FIG. 6 is a view of an example of the control panel.
Figure 7:
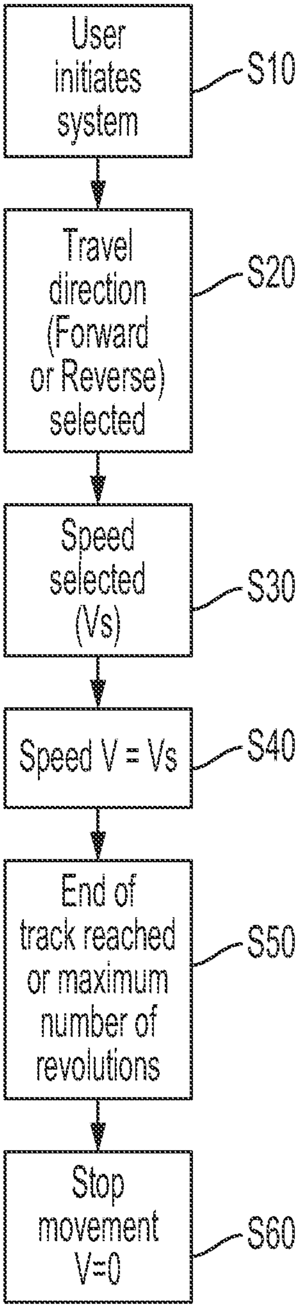
FIG. 7 is a flowchart depicting how the functions are carried out for the system.
Figure 8A:
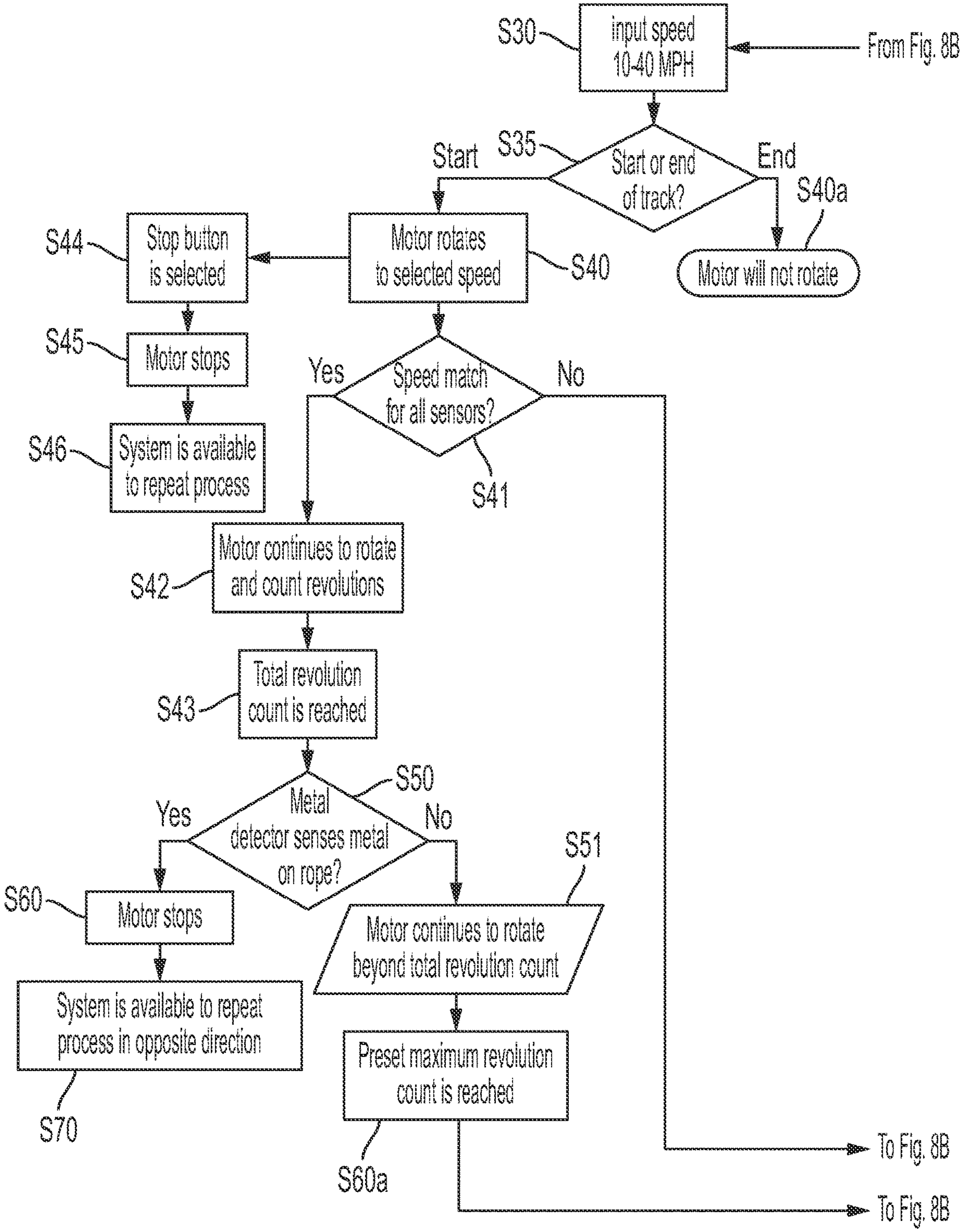
FIGS. 8A and 8B is another flowchart depicting how functions are carried out for the system.
Figure 8B:
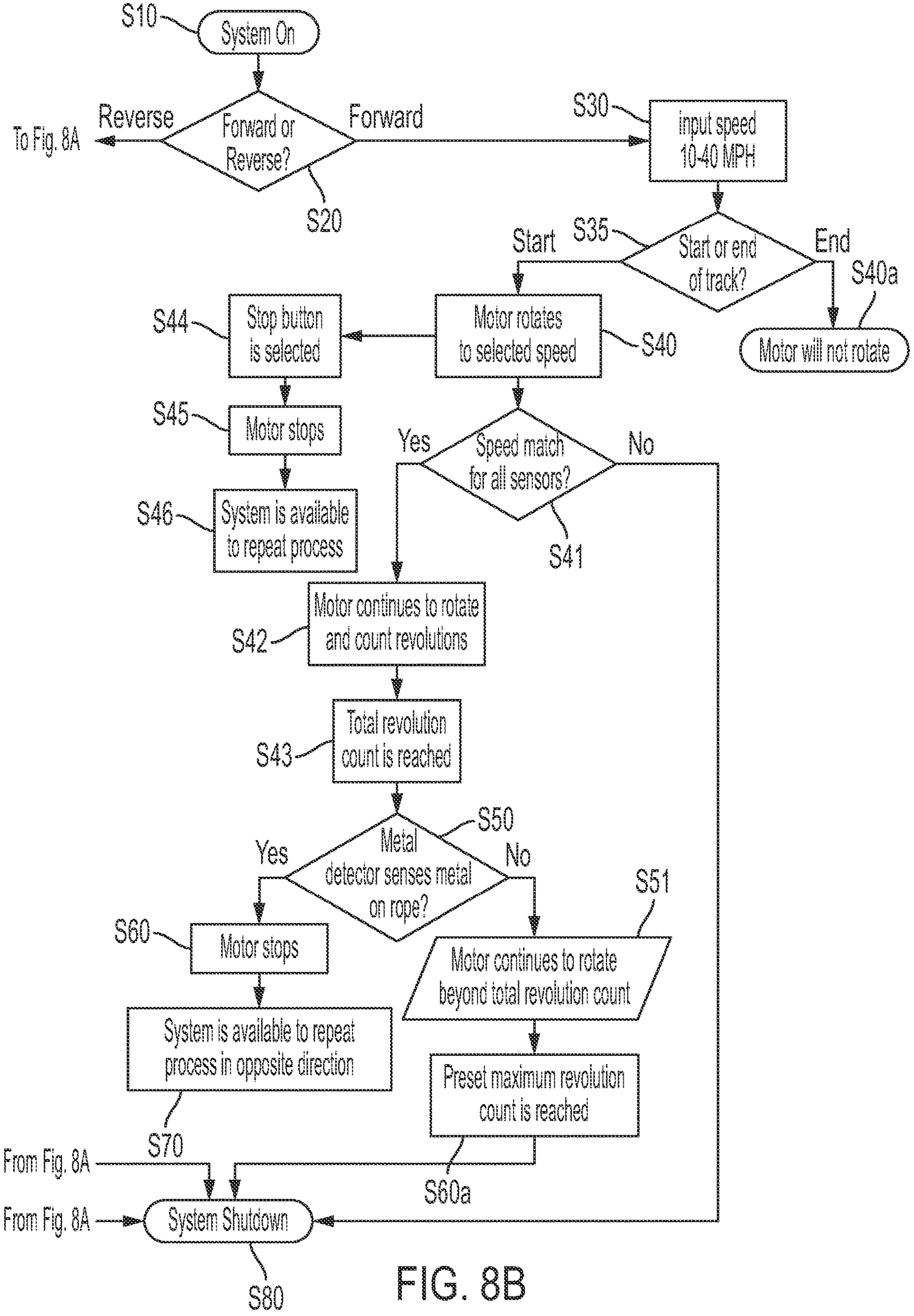
Figure 9:
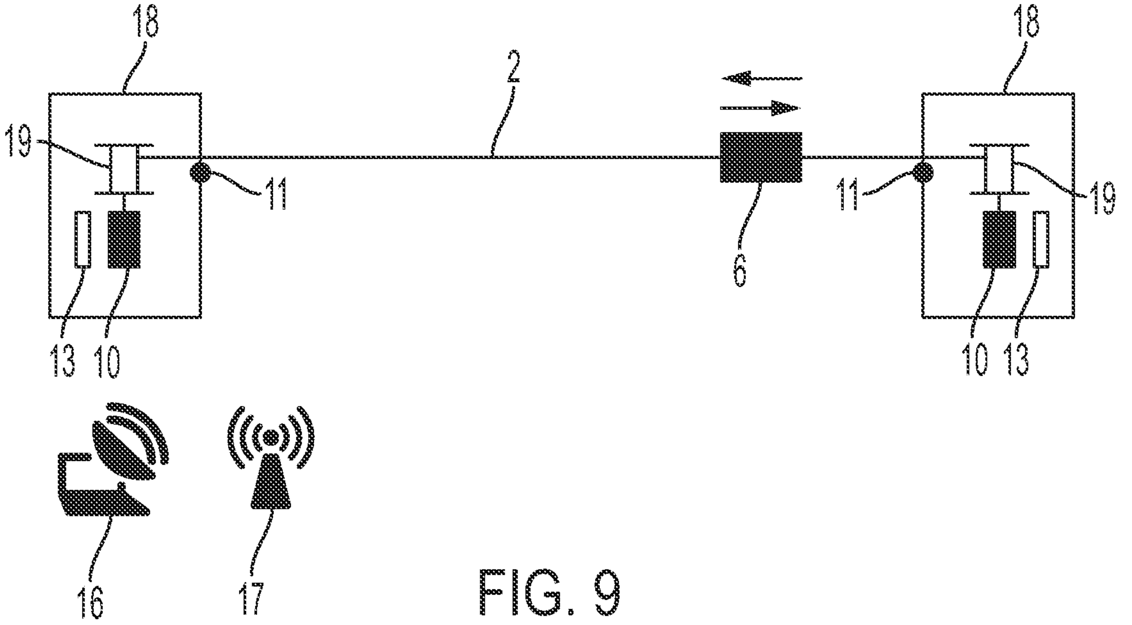
FIG. 9 is another alternative arrangement of the system in the field.

FIG. 1 is a schematic plan view of an overall arrangement of the moving target trainer system in the field. FIG. 2 is a schematic plan view of another example arrangement of the system in the field. FIG. 3 is a top view of an example of the capstan winch assembly. FIG. 4 is a front view of an example of the capstan winch assembly. FIG. 5 is a side view of an example of the tensioner system. FIG. 6 is a view of an example of the control panel. FIG. 7 is a flowchart depicting how functions are carried out for the system. FIGS. 8A-8B is another flowchart depicting how functions are carried out for the system. FIG. 9 is another alternative arrangement of the system in the field.

The moving target trainer system includes a capstan winch assembly 1 that moves a high quality, a low stretch rope (such as Dyneema™, Ultra High Modulus Polyethylene, also known as UHMWPE or Ultra High Molecular Weight Polyethylene) 2 around a closed loop in order to pull a target vehicle, trailer, or sled 6 between both ends of an area of the ground for the target vehicle or sled 6 to travel along. This area of land or ground is referred to as a path or a track, but does not actually include a physical rail. The path can be straight by attaching snatch block assemblies 3 to each end or the path can have a multi-point, non-linear arrangement by moving the rope through open pulleys that are attached to the ground between the snatch block assemblies 3, For purposes of the description herein, the area in which the target vehicle travels is referred to interchangeably as a path or track, and the target vehicle is referred to interchangeably as a target vehicle, a trailer or a sled.

The target vehicle carries the target thereon. Any type of target can be assembled to the vehicle, either two-dimensional or three-dimensional in shape. Non-limiting examples of targets include foam or metal framed structures. The target vehicle may be a trailer having wheels, a sled having skids, or another structure that is capable of moving and holding the target thereon.

As illustrated in FIG. 2, the capstan winch assembly 1 is a mechanical device including a bi-directional, grooved drum that is rotated by a chain driven electric motor 10 that rotates about a horizontal axis. The motor 10 powers grooved drive wheels 9. The rope enters from one side of the grooved drive wheels 9, makes several rotations around the grooved drive wheels 9, and then exits on the opposite side when rotated. Friction, which depends on the size of the drive wheel drum and the number of rotations, causes the rope 2 to move in the desired direction. The system is unique in the fact that there are two, multi-grooved, counter-rotating drive wheel drums 9 that significantly increase friction and reduce slippage. When the rope 2 exits the drive wheel drum 9 its path continues through a series of pulleys (such as a target guide wheel 7 and a motor guide wheel 8), a tensioner system 14 and vertical risers 4. In general, the actual order that the rope travels after leaving the drive wheel drum is the motor guide wheel 8, a weight/spring tensioner system 14, and the trailer guide wheel as it exits the trailer 6. The rope 2 travels along a plurality of snatch block assemblies 3, and winch tension assemblies 5 which are disposed on both sides of the capstan winch assembly 1. The two ends of the rope 2 are connected at the sled 6. This creates an enclosed loop that can be moved either clockwise or counter-clockwise based on the rotating direction of the motor. Due to the unique design, the distance of travel for the sled is limitless. The distance is only limited by how much rope the user supplies.

During research and development of the system, the inventors discovered that the rope elasticity unexpectedly influenced the integrity of the design. The stretch in the rope led to the creation of the tensioner system 14 that quickly takes up the slack of the rope to keep friction on the capstan winch.

Referring to FIG. 4, for example, two drive wheels 9 are provided in a vertical arrangement. The tensioner system 14 includes two sets of pulleys, a top set 14*a* and a bottom set 14*b*, with the rope 2 threaded between them. One row of pulleys is stationary and the other row of pulleys can move towards or away from the stationary row of pulleys. The number of pulleys in each set depends on the length of rope and how much slack needs to be taken up. The rope 2 enters the first pulley on the top row 14*a*, is threaded through the first pulley on the bottom row 14*b*, then goes to the next pulley on the top 14*a*, then the bottom 14*b*, etc. The rope 2 exits the tensioner system 14 on the opposite side from where it started. In this illustrated embodiment, the bottom set of pulleys is the moveable row of pulleys 14*b* and has a constant force pulling away from the top set of pulleys 14*a*, which is the fixed row in this embodiment, by means of a weight or spring assembly. As the moveable row of pulleys 14*b* increases the distance from the fixed row 14*a*, any slack in the rope 2 is rapidly taken up. This prevents the rope 2 from coming out of the grooves on the drive wheels 9. During testing, two tensioner systems were deemed preferable, one on each side of the capstan winch assembly 1. When the capstan winch assembly 1 moves in one direction there is a tension side, the side in which the rope is being pulled towards the trailer 6, and a slack side, the side where the rope exits and moves away from the trailer 6. The tensioners take up slack on the slack side every time the capstan winch assembly 1 is engaged. Although this embodiment arranges the tensioner in a vertical arrangement to utilize space, they could be arranged horizontally.

The snatch block assemblies 3 are ball-bearing pulleys enclosed in a housing that prevents the rope 2 from coming off the ball-bearing pulleys. The snatch block assemblies include snatch blocks that are attached to a metal plate, which is secured to the ground with stakes. The rope 2 passes through each snatch block assembly to keep the rope 2 in a fixed track while creating turning points to form a closed loop. Two examples of arranging the track with different turning points are illustrated in FIGS. 1 and 2. Of course, the track can be arranged in a variety of configurations depending on the size, contours, and obstacles in the area of the land that has been designated for use as a track. As noted earlier, the track is an area of land being used as a path for the target vehicle 6 to travel along.

The vertical risers 4 are extendable poles with a rope trolley mounted at the top. The rope trolley is a pulley that allows the rope 2 to pass through it horizontally. The purpose of the vertical risers 4 is to elevate as much of the closed-loop rope system as possible. Elevating the rope off the ground reduces drag and friction caused by the rope 2 sliding along the ground.

A winch tensioner assembly 5 is a winch that is secured to the ground with stakes and has an extendable long rope or cable, which is separate rope from the rope 2, that attaches to a snatch block. When the winch tensioner is retracted it applies tension to the entire closed-loop rope 2. This ensures that the proper amount of friction is applied to the rope 2 as it rotates around the capstan winch assembly 1.

A target sled or target vehicle 6 is preferably bi-directionally movable. In one embodiment, the sled has two main skids. Between the skids there is a modular frame that allows for the attachment of multiple configurations of simulated enemy vehicles serving as targets. The modular design allows for rapid repairs to take place of only the damaged section. On each end of the sled there is a network of ropes that extend several feet away from the sled and fasten to a connector that is also attached to the rope 2 that is driven by the capstan winch 1. This network of rope around the target sled 6 creates redundancy to protect against a rope severance due to damage from ordnance.

As shown in the example layout of FIG. 2, open faced turn pulleys 15 may be provided for the rope 2 along the track which has a zig-zag configuration.

This system is semi-autonomous. The system may include a processor implemented in hardware, firmware, or a combination of hardware and software. The processor is a central processing unit (CPU), a graphics processing unit (GPU), a microprocessor, a microcontroller, or another type of processing component. In some implementations, the processor includes one or more processors capable of being programmed to perform a function. A memory includes a random access memory (RAM), a read only member (ROM), and/or another type of dynamic or state storage device that stores information and/or instructions for use by the processor.

A user remotely controls the system using, for example, a graphical user interface (GUI), dashboard, or human machine interface (HMI). The GUI utilizes a proprietary software program installed on a programmable logic controller (PLC). The GUI can be controlled at least three separate ways: cellular data connection mode, Local Area Network (LAN) mode or radio frequency (RF) mode. All network electronics 13 (PLC, WiFi/cellular router, motor controller, battery charger, battery controller) are located adjacent to the electric motor 10. For example, an onsite/offsite controller using WiFi or cellular connection 16 and/or an onsite/offsite controller using RF mode 17, may be provided.

After the system is setup and calibrated it is then ready for user input to operate the system. The calibration is described in further detail below. The user has a map on the GUI that displays the sled's current position. The PLC monitors the position of the sled at all times and displays it to the user who is located remotely from the sled. Cameras are not necessary, but can be operated anywhere there is an internet connection. To operate the system, first, the user selects a direction and a speed Vs for the target sled. After the user input, selecting the direction and speed, the system may be autonomously driven. The software logic of the controller gradually speeds up the capstan winch and slows down the motor automatically before the sled reaches the end of the track. The electric motor encoder provides the number of revolutions per minute of the drive wheel to the PLC. As discussed in further detail below, the PLC determines the position of the sled 6 based on the number of revolutions of the drive wheel 9 and determines exactly when to stop by use of a metal proximity sensor 11 that detects a metal crimp on the rope 2 at the end point. Precautions have been implemented in the software that detect when the rope has been broken or is slipping by comparing the two motor guide wheel 8 revolutions per minute (RPM) to each other as well as the motor revolutions per minute. If slippage or broken rope is detected, the system will shut down automatically.

The PLC is an industrial digital computer that may control all processes, handle all inputs and outputs to the various system components, and display the GUI to the end user.

FIG. 7 is a flowchart illustrating an example of semiautonomous operation performed by the controller. For example, when a user initiates the system (S10), e.g. requests a start of the system, the PLC performs the operations as follows.

For example, the user selects a direction of travel (S20) and speed (S30) (if the sled is at the end of the track, only the opposite direction is selectable) by inputting the desired selections into the GUI. The controller receives the desired selections via the wireless network for example.

After the PLC receives the input signal therefrom, it automatically controls the motor 10 to gradually speed up the drive wheel until a speed V equals the desired speed setting (S40), i.e., V=Vs.

The PLC determines the location of the sled based on a signal from the magnet proximity sensor 12 that counts the drive wheel 9 revolutions, so as to know where the sled is located at any given point and time.

If the PLC determines that the sled is within a predetermined distance from the end of the track based on the sensor 12 detection, the PLC automatically controls the drive wheel 9 to gradually slow down (or if a slower speed is selected before the end of the track).

Based on the detection by the metal proximity sensor 11 indicating that the sled has reached the end of the track, which is based on the detection of the metal crimp on the rope (S50), the PLC controls the drive wheel 9 so that the sled is controlled to reach a stop (S60), i.e., V=0. The PLC is also programmed to stop the sled if it rotates above a specific preset maximum revolution threshold at which the system should stop it automatically.

The PLC resets the start/stop points of the track. The system auto-calibrates itself to keep the start/stop points the same unless a recalibration is performed, by the user for example.

If the user desires to continue operation after the sled reaches the end of the track and stops, the user can then only select the opposite direction of travel to reverse movement of the sled on the track.

The dashboard and/or GUI displays a map of the sled position and constantly displays the location based on the drive wheel rotation count.

Although the foregoing description is carried out by the PLC, the user can manually override one or more operations as needed. For example, the user can manually select or the PLC can automatically select, the speed, or the user can override the automatic selection made by the PLC as needed in real-time.

The user can select the start and stop locations for the sled, or the PLC can automatically select the start and stop locations based on pre-set criteria.

An example of performing the calibration is as follows: (i) the sled is moved using the manual controls to the start point; (ii) start point Lat/Long: places a point on the map; (iii) Set Start Point sets the revolution counter to zero; (iv) a message is given to the user to 'Place a metal crimp on the rope at the metal detector (metal proximity sensor 11) closest to the starting point' and the user will then place the metal crimp on the rope on the start point side close to the metal detector (metal proximity sensor 11); (v) the sled is moved using the manual controls to the end point (system is counting revolutions); (vi) set End Point sets the counter to the total number of rotations; (vii) End point Lat/Long: places a point on the map; (viii) a message is given to the user to 'Place a metal crimp on the rope at the metal detector (metal proximity sensor 11) closest to the ending point'; (ix) the user will place a metal crimp on the rope 2 on the end point side close to the metal proximity sensor 11.

Overall Logic: The system moves the sled back and forth on the track and when the metal proximity sensor 11 detects the metal crimp on the rope 2, this sets the current/new end point of the sled. The system continues to Auto-Calibrate to stop in the same place every time.

If the metal proximity sensor 11 does not detect the metal crimp, there is a 'Safety stopping point' that is set to a predetermined number of revolutions past the anticipated stopping spot.

FIGS. 8A, 8B depict a detailed example of the semi-autonomous control of the system in which the direction of travel for the target vehicle is selected to be forward or reverse (S20), the speed is selected (S30), and the motor is rotated depending on whether the target vehicle is at the start or the end of the track (S35), In this example flowchart, the motor will not operate if the user selects a direction that cannot be achieved due to the target vehicle being at the end of the track (S40a). On the other hand, if the vehicle is not at the end of the track, the motor rotates to the selected speed (S40), and unless the stop instruction is input (S44, S45, S46), the controller determines whether the sensors detect that the speed matches for all sensors (S41). If the speed matches, the motor continues to rotate and count revolutions until the total revolution count is reached (S42, S43). At that point, a determination is made as to whether the metal proximity sensor 11 detects the metal on the rope (S50). If the metal on the rope has been detected, the controller stops the motor so as to bring the target vehicle to a stop (S60). The system is then available to repeat the process in the opposite direction (S70). On the other hand, if the metal proximity sensor 11 does not detect the metal on the rope, the motor continues to rotate beyond the total revolution count until a preset maximum revolution count is reached (S51, S60a), and then the system is shut down (S80).

According to the above described embodiment, a method of controlling a moving target system is provided, wherein the system includes a capstan winch assembly including a drive wheel; a target sled; a rope that connects the target sled to the drive wheel in an endless loop, wherein a first end of the rope is connected to a first end of the target sled and a second end of the rope is connected to a second end of the target sled; a sensor configured to detect a location of the sled; a motor configured to control rotation of the drive wheel, wherein the rope is provided on the drive wheel so as to move by rotation of the drive wheel; a user input unit located remotely from the capstan winch assembly and the target sled; and a processor including a memory programmed to control the motor, comprising: receiving a start command based on an input of a user from the user input unit; based upon receiving the start command, controlling rotation of the drive wheel to move the rope thereby causing the target sled to travel at a predetermined speed until the target sled reaches a predetermined location; and when the target sled reaches the predetermined location based on the detection by the sensor, controlling the motor to stop rotation of the drive wheel thereby causing the target sled to stop traveling.

FIG. 9 illustrates an alternative arrangement of the system. With this arrangement, instead of using a capstan winch assembly on a closed loop as described hereinbefore, two separate winch assemblies 18 are used, with one assembly located at each end of a designated target engagement area. Each winch assembly 18 is powered individually by its own power source (i.e. gas or electric motor 10). Each winch has a spool 19 that gathers the rope 2 or a cable as the spool rotates to pull the target trailer 6 toward its location, and conversely, the winch motor 10 on the opposing side is set to a neutral state so as to allow the rope/cable to un-spool therefrom in order to allow the target trailer 6 to be pulled away from its location. With this method two winches may be placed at predetermined locations either permanently or temporarily. This alternative system is controlled similarly to the capstan winch system. Just as with the capstan winch, the target sled 6 could be pulled either in a straight line or in a non-linear pattern using open-faced pulleys.

More specifically, when a target movement direction is selected by the operator, a first winch, of the two winches, is enabled to be driven by the motor 10. Once enabled, the operator may select the speed, by using the GUI for example, so as to control the motor 10 to start rotating a large spool 19 of the first winch to achieve the selected speed. Just as with the capstan winch, the position of the sled 6 may be determined by counting the rotations of the spool 19 or motor 10. As described above with the earlier embodiments, a metal crimp may be placed on the rope/cable 2 to stimulate a metal proximity sensor 11 positioned near the rope/cable, to determine that the target sled 6 has reached a designated area or predetermined location and/or the end of the path for travel. Upon this determination that the target sled 6 has reached the designated position or area, the winch disables the power of the motor 10 of the first winch, which causes the target sled 6 to stop moving at the predetermined location or the end of the path for travel. When the opposite direction is selected by the operator, power to a second winch, of the two winches, is enabled and the process is repeated for the opposite direction, so that the second winch gathers the rope/cable on its spool to pull the target sled 6 in the selected opposite direction, while the first winch allows the rope/cable to unspool therefrom.

As the rope/cable 2 is wound onto the spool 19 the diameter will increase. This increase in diameter will cause the rope/cable 2 to be reeled in at a faster rate unless the speed of the motor 10 is reduced. In order to compensate for this, the rope/cable should be routed through a pulley immediately after leaving the spool. The RPM of this cable or wheel may be monitored by the controller. The controller is configured to adjust the RPM of the motor/spool so that a constant RPM will be maintained, ensuring that the target sled is pulled at a constant speed if desired.

As described above, a system for moving a practice target includes a pair of spool winch assemblies, including a first spool winch assembly 18 and a second spool winch assembly 18, wherein the first spool winch assembly 18 includes a first spool 19 and a first motor 10, and the second spool winch assembly 19 includes a second spool 19 and a second motor 10. The target sled 6 is provided, the rope 2 connects the target sled 6 to the first spool 19 of the first spool winch assembly 18 and the second spool 19 of the second spool winch assembly 19. A first end of the rope 2 is connected to the first spool 19 and a second end of the rope 2 is connected to the second spool 19. A first sensor 11 provided for the first spool and a second sensor 11 provided for the second spool, are configured to detect a location of the sled 6, wherein the first motor 10 of the first winch assembly and the second motor 10 of the second winch assembly, are configured to control rotation of the first spool 19 and the second spool 19, respectively. The rope 2 gathers on the first spool 10 or the second spool 10 depending on whether the first spool or the second spool is being rotated.

A user input unit is located remotely from the pair of spool winch assemblies and the target sled. A processor including a memory is programmed to: receive a start command based on an input of a user from the user input unit; based upon receiving the start command, control the first motor 10 of the first spool winch assembly 18 to cause rotation of the first spool 19 to move the rope 2 thereby causing the target sled 6 to travel toward the first spool winch assembly 18 at a predetermined speed, and away from the second spool winch assembly 18, until the target sled 6 reaches a predetermined location. When the target sled reaches the predetermined location based on the detection by the first sensor, the processor controls the first motor to stop rotation of the first spool thereby causing the target sled to stop traveling.

As described above, the novel system provided herewith provides a moving target that can be engaged from any dive angle and any inbound direction, thereby providing the ability to train more similarly to real life fighting conditions than conventional systems provide.

In addition, the system described herein provides a target that can be engaged with continuously and persistently since downtime for repairs is significantly decreased. The target sled is designed to withstand battle damage, unlike conventional devices which must be protected from being hit altogether.

The novel system described herein is remotely controlled beyond line of sight (LOS). The system is controlled over a wireless connection using either cellular or a high gain antenna directional antenna or, in a completely unique way, a pilot-controlled radio link. The target controller software has built-in logic that makes control so simple that any person can control it with no training, from anywhere in the world and access to a computer connected to the internet. The second option, radio frequency (RF) control, allows anyone with an aircraft radio (or handheld radio) to control the target sled. When placed in "Air" mode the software will allow the pilots conducting the training to start and stop the sled just by "clicking the mic" just as pilots turn on the runway lights at airports all around the world.

Unlike other systems, the moving target controller offers remote access, through a wireless network. This is important because, once the system has been set up, users are able to control the target sled movement from a location that is a safe distance from the target, reducing chances of harm from errant strikes. Users can log in to the system and control it remotely. The system is semi-autonomous because it includes a series of sensors and electronic components that allow the target sled to be sped up or slowed down without requiring control by the user.

The use of a capstan winch allows the target vehicle/sled to be pulled on a virtually endless track of ground. By using the capstan winch, spool after spool of rope can be spliced together creating a track that can be more than 2 miles long.

The target is portable and can be installed virtually anywhere, at a low cost and with a minimal environmental impact.

Since the target is affordable, more aviators can benefit from the ability to train and engage with moving targets.

The foregoing disclosure provides illustration and description, but is not intended to be exhaustive or to limit the implementations to the precise form disclosed. Modifications and variations are possible in light of the above disclosure or may be acquired from practice of the implementations.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

LISTING OF ELEMENTS

1 Capstan Winch Assembly
2 Rope
3 Snatch Block Assembly
4 Vertical Riser
5 Worm Winch Assembly/Winch Tensioner Assembly
6 Target Sled/Trailer
7 Target Guide Wheel
8 Motor Guide Wheel
9 Grooved Drive Wheels
10 Electric Motor
11 Metal Proximity Sensor
12 Magnet Proximity Sensor (RPM Sensor)
13 Network Electronics
14 Spring/weight tensioner system
**14*a*** Top spring/weight
**14*b*** Bottom spring/Weight
15 Open Faced Turn Pulley
16 Onsite or offsite controller using WiFi or cellular connection
17 Onsite or offsite controller using Radio Frequency mode
18 Spool Winch Assembly
19 Spool

What is claimed is:

1. A system for moving a practice target, comprising:

a capstan winch assembly including a drive wheel and a tensioner system at opposing first and second sides of the drive wheel;

a target sled;

a rope that connects the target sled to the drive wheel in an endless loop, wherein a first end of the rope is connected to a first end of the target sled and a second end of the rope is connected to a second end of the target sled;

a motor configured to control rotation of the drive wheel bi-directionally, wherein the rope is provided on the drive wheel so as to move by rotation of the drive wheel;

a user input unit located remotely from the capstan winch assembly and the target sled; and a processor including a memory programmed to:

receive a start command based on an input of a user from the user input unit;

based upon receiving the start command, control rotation of the drive wheel to move the rope thereby causing the target sled to travel at a predetermined speed until the target sled reaches a predetermined location;

detect a position of the target sled based on a rotation count of the drive wheel; and when the target sled reaches the predetermined location, control the motor to stop rotation of the drive wheel thereby causing the target sled to stop traveling, wherein the drive wheel comprises two drive wheels configured to counter-rotate and move the rope in a figure-8 pattern and feed the rope to the tensioner system, wherein the tensioner system receives the rope from the two drive wheels and is configured to maintain a predetermined tension of the rope during rotation of the two drive wheels as the target sled moves across ground surfaces over at least one mile at a speed of at least 40 miles per hour, and wherein the tensioner system includes two sets of pulleys, including an upper set of pulleys and a lower set of pulleys, with the rope disposed in contact with each of the upper set of pulleys and the lower set of pulleys in an alternating configuration, wherein one of the upper set of pulleys or the lower set of pulleys is movable towards and away from the other one of the upper set of pulleys and the lower set of pulleys so as to increase or decrease a distance therebetween and adjust a slack in the rope.

2. The system according to claim 1, wherein the two drive wheels comprise multiple grooves configured to hold the rope therein, and the upper set of pulleys and the lower set of pulleys are positioned to provide tension to the rope so as to prevent the rope from coming out of the grooves of the two drive wheels.

3. The system according to claim 1, wherein the motor includes two motors and each drive wheel is controlled by a respective motor.

4. The system according to claim 1, wherein the system is configured for air-to-surface target training.

5. The system according to claim 1, wherein the capstan winch assembly further includes a motor guide wheel positioned between the two drive wheels and the tensioner system at the opposing first and second side of the two drive wheels configured to guide the rope between the two drive wheels and the tensioner system.

6. A method of controlling a moving target system, wherein the system includes a capstan winch assembly including a drive wheel and a tensioner system at opposing first and second sides of the drive wheel; a target sled; a rope that connects the target sled to the drive wheel in an endless loop, wherein a first end of the rope is connected to a first end of the target sled and a second end of the rope is connected to a second end of the target sled; a motor configured to control rotation of the drive wheel, wherein the rope is provided on the drive wheel so as to move by rotation of the drive wheel; a user input unit located remotely from the capstan winch assembly and the target sled; and a processor including a memory programmed to control the motor, comprising:

receiving a start command based on an input of a user from the user input unit;

based upon receiving the start command, controlling rotation of the drive wheel to move the rope thereby causing the target sled to travel at a predetermined speed until the target sled reaches a predetermined location;

detecting a position of the target sled based on a rotation count of the drive wheel; and when the target sled reaches the predetermined location, controlling the motor to stop rotation of the drive wheel thereby causing the target sled to stop traveling, wherein the drive wheel comprises two drive wheels configured to counter-rotate and move the rope in a figure-8 pattern and feed the rope to the tensioner system, wherein the tensioner system receives the rope from the two drive wheels and maintains a predetermined tension of the rope during rotation of the two drive wheels as the target sled moves across ground surfaces over at least one mile at a speed of at least 40 miles per hour, and wherein the tensioner system includes two sets of pulleys, including an upper set of pulleys and a lower set of pulleys, with the rope disposed in contact with each of the upper set of pulleys and the lower set of pulleys in an alternating configuration, the method further comprising:

moving one of the upper set of pulleys or the lower set of pulleys towards and away from the other one of the upper set of pulleys and the lower set of pulleys so as to increase or decrease a distance therebetween and adjust a slack in the rope.

7. The method according to claim 6, wherein the two drive wheels comprise multiple grooves configured to hold the rope therein, and the upper set of pulleys and the lower set of pulleys are positioned to provide tension to the rope so as to prevent the rope from coming out of the grooves of the two drive wheels.

* * * * *